(12) United States Patent
Tischer et al.

(10) Patent No.: US 12,051,817 B2
(45) Date of Patent: Jul. 30, 2024

(54) BATTERY MODULE CLAMSHELL

(71) Applicant: OASIS AEROSPACE INC., Edmonton (CA)

(72) Inventors: Eric Tischer, Dublin, CA (US); Scott Holmes, Edmonton (CA); Thomas Lockwood, Portsmouth, VA (US)

(73) Assignee: Oasis Aerospace Inc., Edmonton (CA)

( * ) Notice: Subject to any disclaimer, the term of this patent is extended or adjusted under 35 U.S.C. 154(b) by 0 days.

(21) Appl. No.: 18/479,988

(22) Filed: Oct. 3, 2023

(65) Prior Publication Data

US 2024/0113371 A1    Apr. 4, 2024

Related U.S. Application Data

(60) Provisional application No. 63/412,720, filed on Oct. 3, 2022.

(51) Int. Cl.
| | |
|---|---|
| *H01M 50/231* | (2021.01) |
| *H01M 10/615* | (2014.01) |
| *H01M 10/6571* | (2014.01) |
| *H01M 50/213* | (2021.01) |
| *H01M 50/264* | (2021.01) |
| *H01M 50/284* | (2021.01) |
| *H01M 50/505* | (2021.01) |

(52) U.S. Cl.
CPC ..... *H01M 50/231* (2021.01); *H01M 10/6571* (2015.04); *H01M 50/213* (2021.01); *H01M 50/264* (2021.01); *H01M 50/284* (2021.01); *H01M 50/505* (2021.01); *H01M 10/615* (2015.04)

(58) Field of Classification Search
CPC .................. H01M 10/615; H01M 10/6571
See application file for complete search history.

(56) References Cited

U.S. PATENT DOCUMENTS

| | | | | |
|---|---|---|---|---|
| 4,920,019 | A | * | 4/1990 | Stoklosa ............ H01M 50/284 |
| | | | | 429/158 |
| 6,379,837 | B1 | | 4/2002 | Kanaishi et al. |
| 8,057,630 | B2 | | 11/2011 | Hermann et al. |

(Continued)

FOREIGN PATENT DOCUMENTS

| | | |
|---|---|---|
| CA | 3226851 A1 | 1/2023 |
| CN | 100508247 C | 7/2009 |

(Continued)

OTHER PUBLICATIONS

Wilmot, R. , "Adhesives & Sealants in Battery & Hybrid Electric Vehicles", Retrieved from e-motec.net (E-Mobility Technology International) on Jan. 17, 2024, Mar. 15, 2021, 11 pgs.

*Primary Examiner* — Matthew J Merkling
(74) *Attorney, Agent, or Firm* — Elmore Patent Law Group, P.C.; Joseph C. Zucchero; Carolyn S. Elmore (57) ABSTRACT

The invention is a battery clamshell plate comprising a plurality of laminate layers stacked and connected together. The laminate layers may be made of printed circuit board (PCB). The laminate layers may have cut outs to house battery cells, of which the battery cells are connected to the battery clamshell plate by friction or mechanical means. The invention considers strategies to minimize weight and to ensure resistance to shock and vibration failures. This invention also considers air cooling in between cells.

16 Claims, 6 Drawing Sheets

(56) References Cited

U.S. PATENT DOCUMENTS

| | | | |
|---|---|---|---|
| 8,173,295 B2 | 5/2012 | Villanueva et al. | |
| 9,440,601 B2 | 9/2016 | Soleski et al. | |
| 10,693,180 B2 | 6/2020 | Li et al. | |
| 10,818,957 B2 | 10/2020 | Lee et al. | |
| 11,239,533 B2 | 2/2022 | Zeng et al. | |
| 11,283,118 B2 | 3/2022 | Yoo et al. | |
| 11,335,970 B2 | 5/2022 | Kwon et al. | |
| 2008/0292945 A1* | 11/2008 | Kumar | H01M 10/658 |
| | | | 429/120 |
| 2013/0164567 A1 | 6/2013 | Olsson et al. | |
| 2015/0072209 A1* | 3/2015 | Tyler | H01M 10/482 |
| | | | 429/159 |
| 2017/0005316 A1* | 1/2017 | Harris | H01M 50/213 |
| 2018/0331343 A1 | 11/2018 | Wilson et al. | |
| 2019/0280267 A1* | 9/2019 | Bae | H01M 10/6556 |
| 2020/0343516 A1* | 10/2020 | Harris | H01M 50/519 |
| 2020/0365864 A1* | 11/2020 | Gilton | H01M 50/572 |
| 2020/0373634 A1 | 11/2020 | Choi | |
| 2022/0037710 A1 | 2/2022 | Yoon et al. | |
| 2022/0158271 A1 | 5/2022 | Kang et al. | |
| 2022/0173452 A1 | 6/2022 | Howe et al. | |
| 2023/0261269 A1* | 8/2023 | Gupta | H01M 50/519 |
| | | | 429/7 |
| 2023/0361378 A1* | 11/2023 | Keum | H01M 50/227 |

FOREIGN PATENT DOCUMENTS

| | | |
|---|---|---|
| CN | 103985912 A | 8/2014 |
| CN | 102576828 B | 4/2016 |
| CN | 210897471 U | 6/2020 |
| CN | 211907874 U | 11/2020 |
| CN | 214227080 U | 9/2021 |
| CN | 216818530 U | 6/2022 |
| EP | 3823079 A1 | 5/2021 |
| EP | 4089787 B1 | 12/2023 |
| JP | 2019023996 A | 2/2019 |
| WO | 2017132575 A1 | 8/2017 |
| WO | 2022003368 A2 | 1/2022 |
| WO | 2023285882 A1 | 1/2023 |

\* cited by examiner

BATTERY MODULE CLAMSHELL

RELATED APPLICATION

This application claims the benefit of U.S. Provisional Application No. 63/412,720, filed on Oct. 3, 2022. The entire teachings of the above application are incorporated herein by reference.

TECHNICAL FIELD

The present invention relates to an apparatus for a battery module and, in particular, a battery module clamshell plate and battery module.

BACKGROUND

There is much interest in developing battery-powered vehicles. These applications often require that the battery cells be mechanically and electrically coupled together. This is problematic, especially with large numbers of battery cells.

If the technology is to be applied to aircraft, consideration also has to be given to minimize weight and to ensure resistance to shock and vibration failures. Liquid cooling (as is common in vehicles) is challenging in aircraft so consideration for air cooling in between cells also has to be given. Consideration also has to be given to lithium battery cell thermal runaway and fire protection for aircraft.

SUMMARY OF THE INVENTION

In accordance with a broad aspect of the present invention, there is provided a battery module clamshell plate.

In accordance with another broad aspect of the present invention, there is provided a battery clamshell plate comprising a plurality of laminate layers stacked and connected together, the plurality of laminate layers including: a top laminate layer; a bottom laminate layer; and a middle laminate layer sandwiched between the top and the bottom laminate layers.

In accordance with another broad aspect of the present invention, there is provided a battery module incorporating the battery clamshell plate and one or more batteries.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all within the present invention. Furthermore, the various embodiments described may be combined, mutatis mutandis, with other embodiments described herein. Accordingly, the drawings and detailed description are to be regarded as illustrative in nature and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring to the drawings, several aspects of the present invention are illustrated by way of example, and not by way of limitation, in detail in the figures, wherein.

DETAILED DESCRIPTION OF EMBODIMENTS

The detailed description set forth below in connection with the appended drawings is intended as a description of various embodiments of the present invention and is not intended to represent the only embodiments contemplated by the inventor. The detailed description includes specific details for providing a comprehensive understanding of the present invention. However, it will be apparent to those skilled in the art that the present invention may be practiced without these specific details.

Figure 1:
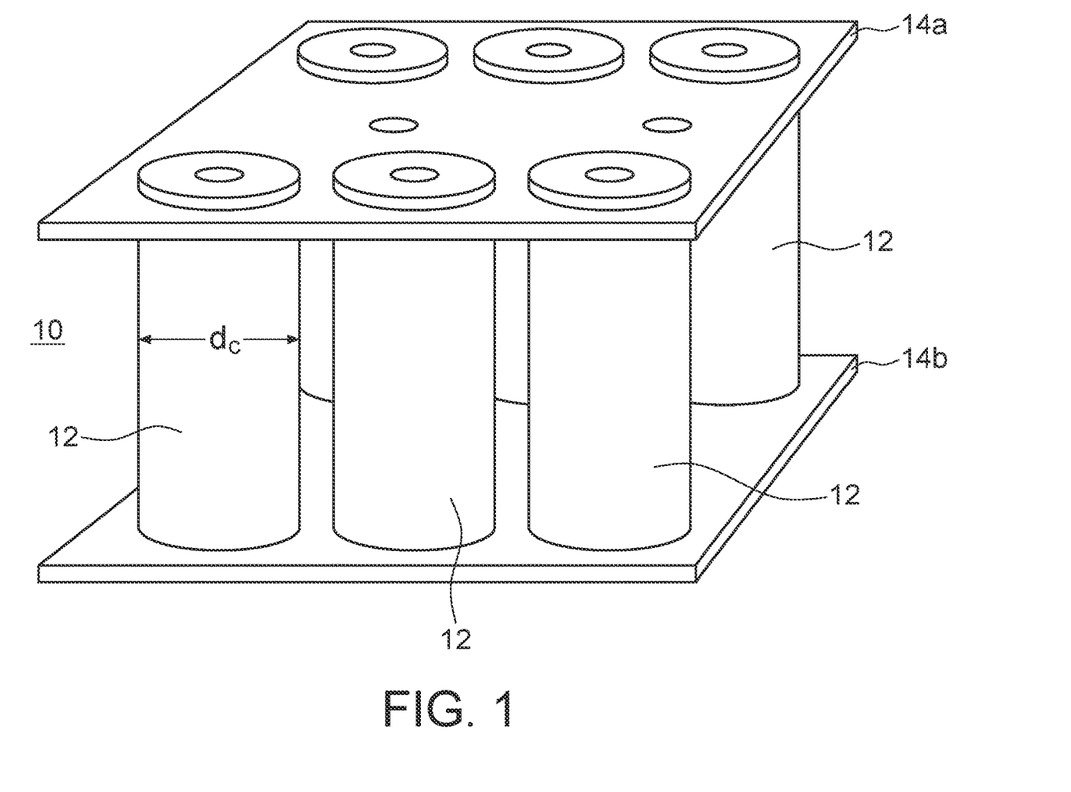
FIG. 1 is a perspective view of a battery module.
Figure 2:
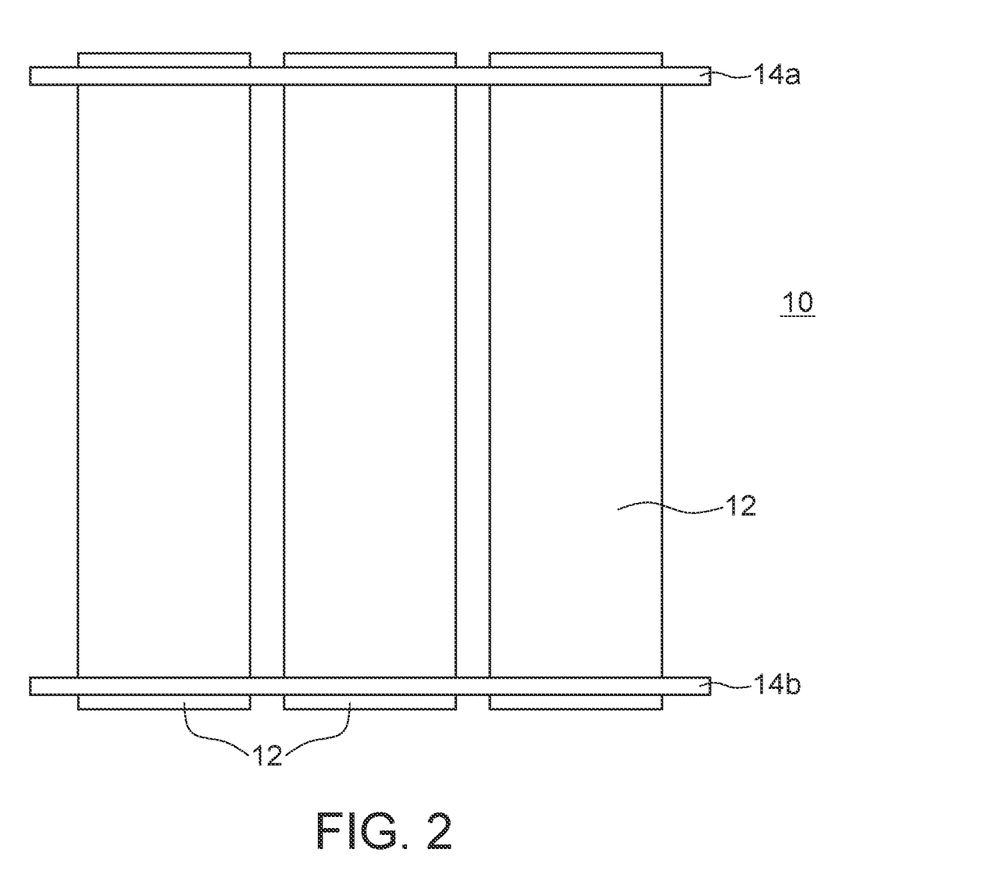
FIG. 2 is a side elevation view of the battery module of FIG. 1.

An apparatus has been invented relating to a battery module 10. The battery module may include multiple battery cells 12 held together by at least one clamshell plate. In the illustrated embodiment, there are two clamshell plates: an upper plate 14a and a lower plate 14b. While six battery cells are shown in the embodiments illustrated herein, there may be any number of battery cells secured together with clamshell plates.

It is noted that clamshell plate is a term in the art and such a plate can have various shapes. For example, as illustrated, a clamshell plate of the type used in a battery pack assembly need not have a concave clamshell shape and need not come together with other plates in a clamshell arrangement. At the same time, however, the clamshell of the present invention need not be shaped only like that illustrated. For example, the clamshell plate of the present need not be entirely flat and need not be only rectangular or square.

The multiple battery cells 12 may be cylindrically housed. For example, type 21700 batteries are cylindrically housed and have a diameter d c that can be readily determined. The battery module includes a plurality of battery cells 12 arranged side by side, in parallel and the clamshell plates 14a, 14b are installed adjacent (i.e. on or near) the ends of the arrangement of battery cells.

The clamshell plates illustrated herein include recesses 18 formed as indentations or holes for accepting the end of each battery cell in the battery module.

Friction fit or mechanical means (i.e. adhesives or structural connectors) may be used to hold the battery module together. For example, friction fit or mechanical couplings can be employed to secure the battery cells 12 to the plates 14a, 14b. For example, the clamshell plate may be secured to the plurality of battery cells by injecting adhesive into a space between the clamshell plate and each battery cell.

As another option, the clamshell plates may be friction fit on the battery cells by forming the plates to have recesses 18 configured to effect a close interference fit to the outer surface of the batteries that are to be secured to the plates.

Figure 3:
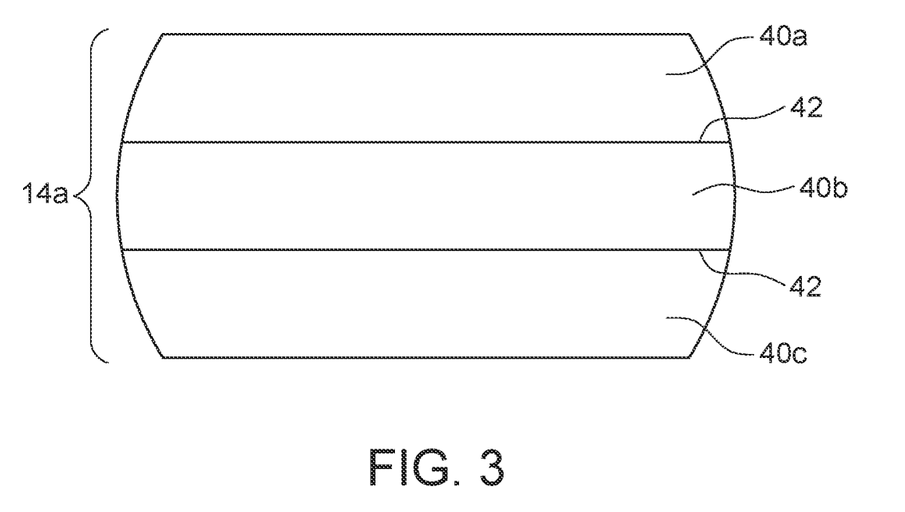
FIG. 3 is an enlarged side elevation view of an edge of the clamshell plate of FIG. 2.
Figure 4:
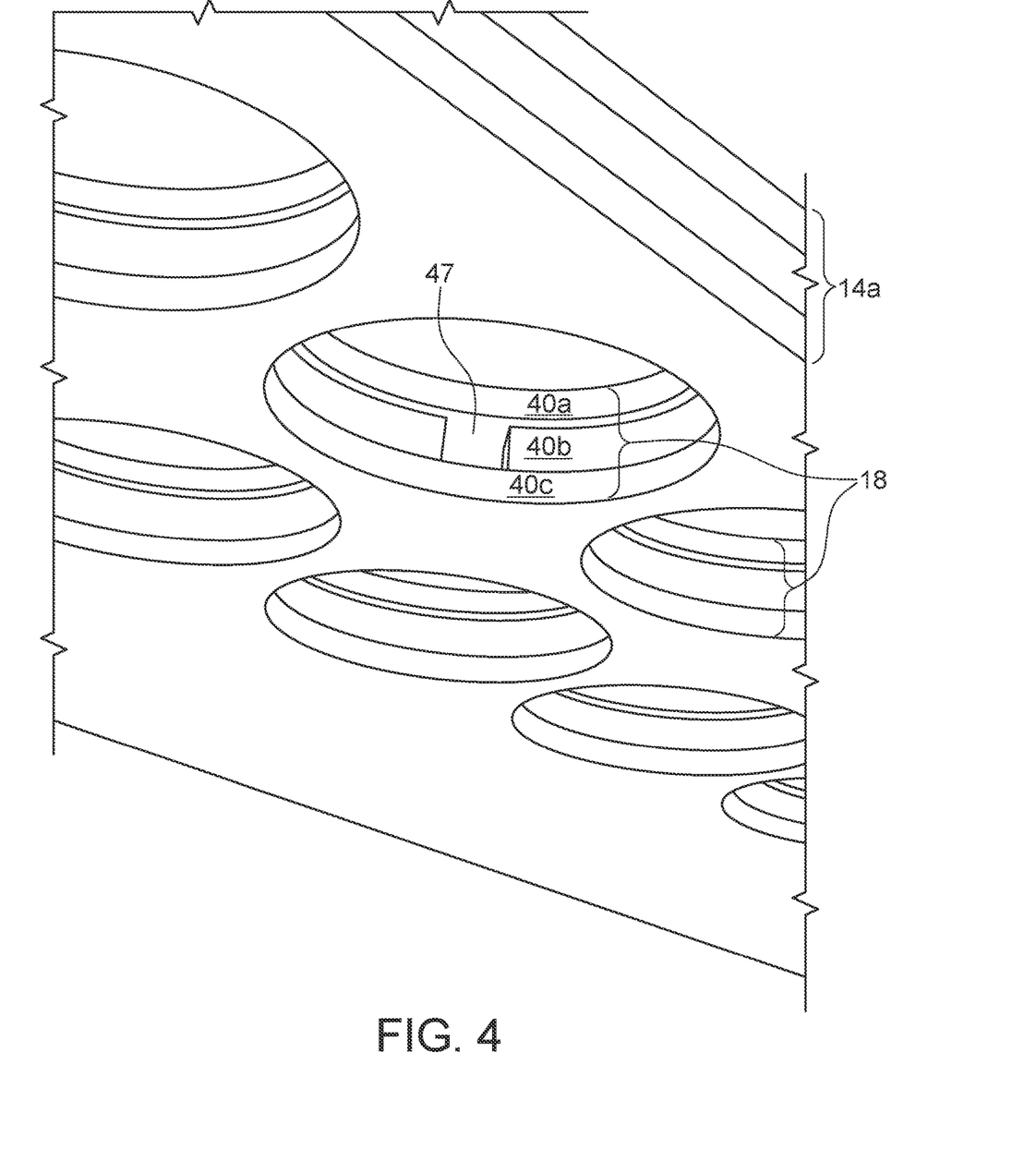
FIG. 4 is a perspective view of another clamshell plate.

The clamshell plate 14a may have a plurality of laminate layers 40a, 40b, 40c stacked and connected together. The connection between laminate layers may be by clamping, welding or adhering the planar surfaces of two laminate layers at their interfacing surface 42. In one embodiment, the laminate layers 40a, 40b, 40c are clamped together using mechanical fasteners such as rivets 41 or screws using an array of holes that are aligned on the various plates. The shape of each laminate layer may be selected such that when stacked and connected, the plurality of laminate layers together define the shape and surface configuration for the desired shape and structure of the clamshell plate 14*a*.

In one embodiment, for example, the clamshell plate includes ports and/or channels 47 through which form conduits for accommodating fluids. The channels and entry ports are constructed by making holes and cutouts in one or more of the laminate layers.

Figure 5:
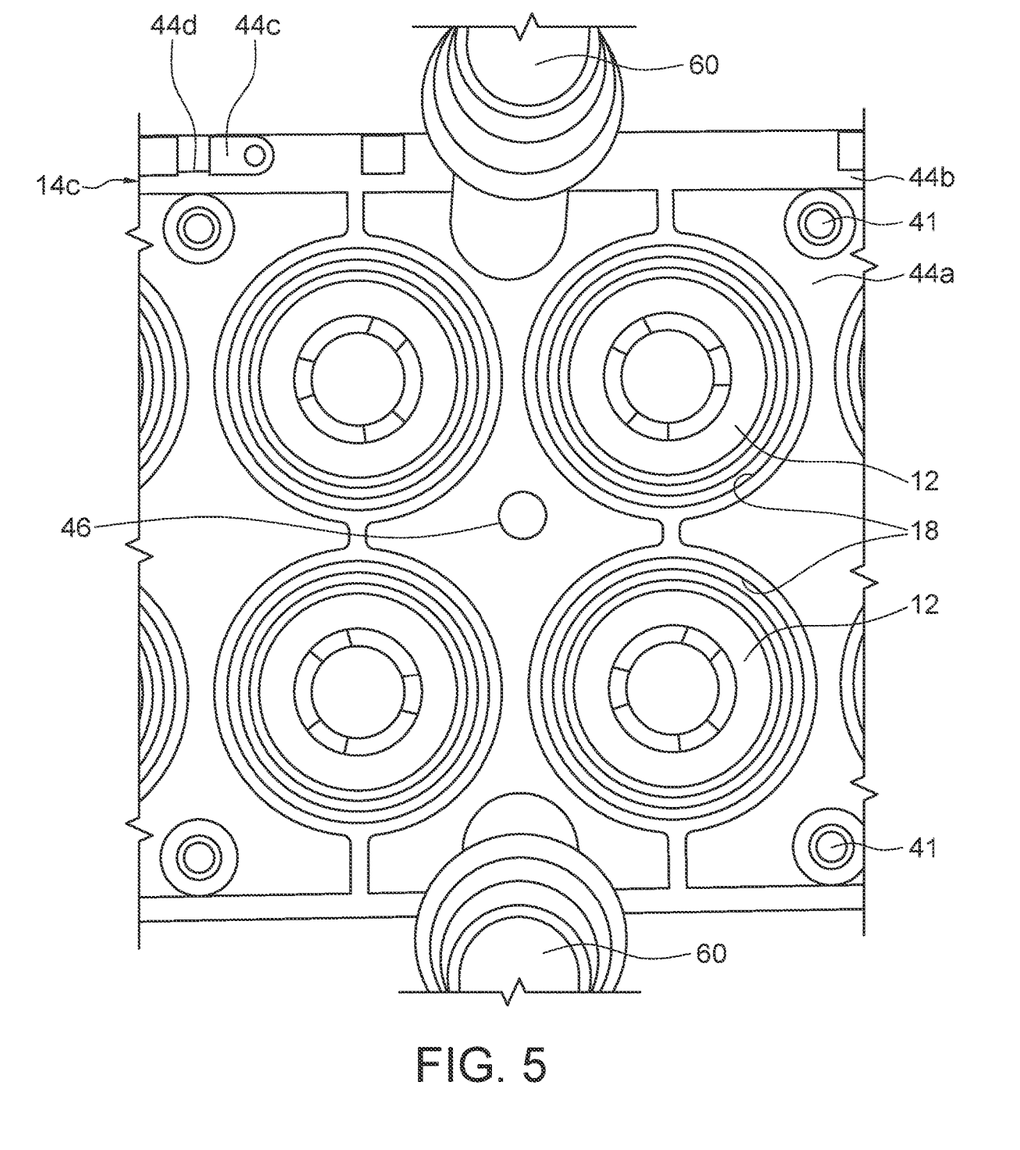
FIG. 5 is a plan view of a portion of a battery module.
Figure 6:
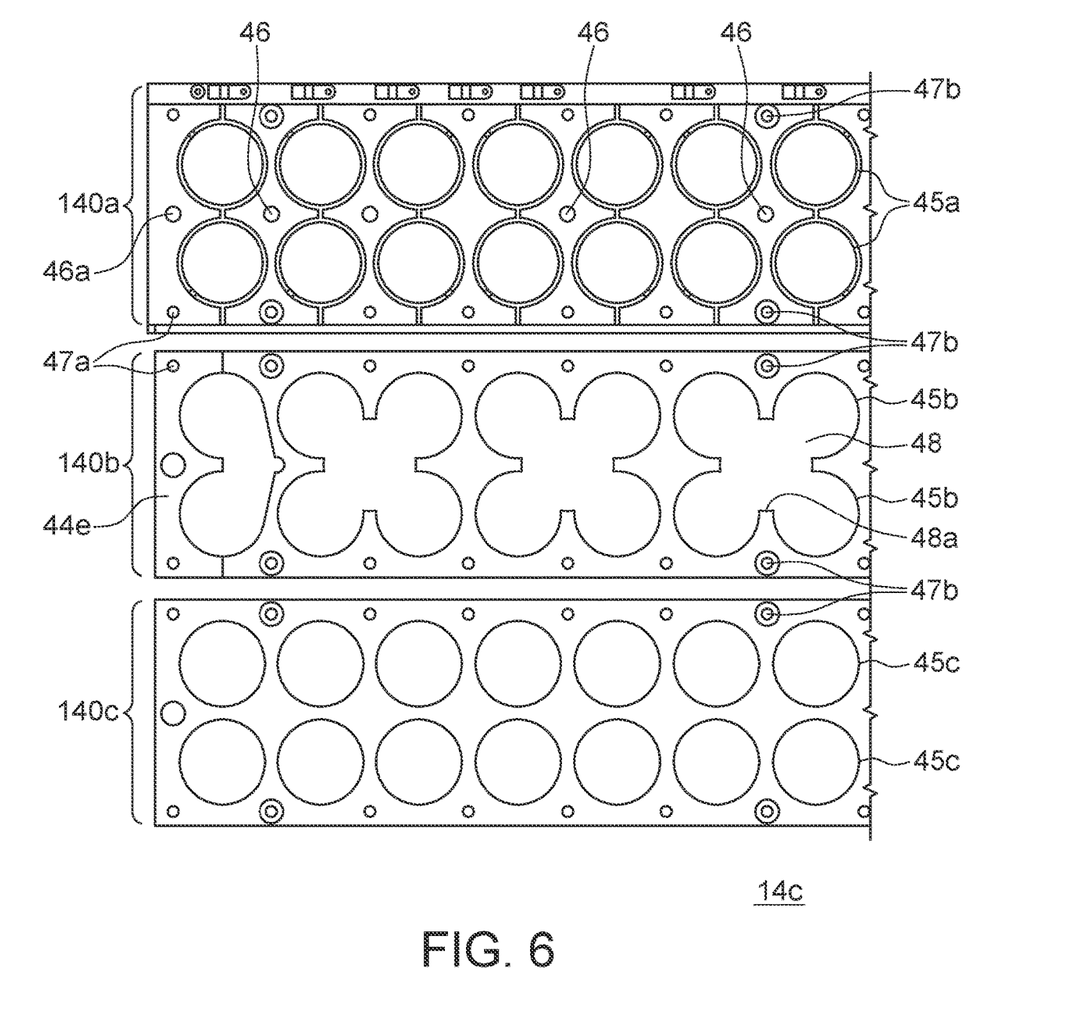
FIG. 6 is an exploded view of a plurality of PCB layers ready for assembly into a clamshell plate.

In one embodiment, illustrated in FIGS. 5 and 6, one or more of the laminate layers 40*a*, 40*b*, 40*c* are made of printed circuit board (PCB). This allows for the clamshell plate 14*c* to serve the dual function of providing the clamshell structure and accommodating circuitry 44*a* and other structures 44*b*-44*e*. Such a layered PCB clamshell plate 14*c* provides a ridged clamshell structure for mechanically supporting the battery cells in the battery module, fulfilling multiple functions, and reducing the number of components required to construct the battery module and its support system.

The circuitry may, for example, incorporate electrical current-carrying strips called "bus bars" or "current collectors" 44*a*. Bus bars may be used for connecting groups of cells in parallel.

Bus bars may be connected by conductors (not shown), such as wires or caps, to the conducting portion of selected, adjacent battery cells. Bus bars 44*a* may also act as conductors to move current between cells. Small amounts of current can flow from one cell to another if they are all connected in the same row. This may allow for small variations in battery cell manufacturing and one "strong" cell can help out the "weaker" ones. Also, if one cell becomes disconnected, the current from the previous group connections may flow through the bus bars around the dead cell. Printing these bus bars onto a circuit board is a major advantage over assembling separate bus bar pieces into a clamshell.

The circuitry may, for example, use copper "traces" 44*b* to route voltage to a common location on the clamshell. This may measure the individual cell electrical characteristics, such as voltage and resistance, and balancing the cell rows to the same voltage. These traces printed on the PCB may replace individual "voltage tap" wires connected to the battery management system.

The circuitry could, for example, include other structures such as solder pads 44*c* for interconnecting an external battery management system (BMS) using wires or connectors. A BMS may be used to monitor the voltage of each cell in the battery module. Connected to solder pad 44*c* may be a thin trace 44*d* on the PCB, which is used as a fuse element for short circuit protection.

Other devices such as microcontrollers, voltage regulators, temperature sensors, current sensors, moisture sensors, multi-conductor plugs for connecting a BMS, etc. may be incorporated into the clamshell. The traces can be high current such as main bus bars or low current such as voltage sense leads or resistive heat traces. Some traces are very small, such as a fuse 44*d* for a voltage sense lead.

For example, the BMS is required for all lithium batteries to maintain correct temperature, charge and cell balancing. The BMS can be applied onto the clamshell PCBs. Most prior BMS's are separate devices that are wired to the battery prior to use.

In another example, the battery clamshell plate may be configured to include electric heat tracing for battery thermal management. The electric heat tracing includes printed copper traces throughout the clamshell PCB layers. When electricity is flowed through the copper traces, the resistance therein creates heat which uniformly warms the battery pack to a desired temperature. The heat tracing may include sensors or control equipment such as thermistors, fusing and current switching devices. These heat tracing "traces" may be printed on the circuit boards and therefore may be integral with the PCB clamshell as a single part. Sometimes the sensors or other components may be soldered on.

In another example, the battery clamshell plate may be configured to include auxiliary or non-battery electronics and circuitry. If, for example the battery pack is intended for use in a drone, some of the drone circuits such as the autopilot or landing gear servo system may be included in the clamshell to reduce the number of wires on the drone. Another example is the circuits for a drone camera. The drone camera may operate on 5V but the main flight motors may operate on 30V. A voltage regulator could be incorporated in the clamshell PCB circuitry to step the voltage down so the camera can be powered by the same battery as the flight motors even though they operate at different voltages. Some of these circuits may be completely unrelated to the battery itself and are only installed for that specific application. In one embodiment, a drone's "motherboard" could be incorporated onto the clamshell PCB layer, thereby eliminating a whole board.

Because PCB's may be used to construct to the clamshell plate, the circuits can be incorporated into the plate, on the surface plates or in a middle PCB layer. One PCB layer could include some circuits, such as bus bars, and another PCB layer, such as a middle layer, can include other circuits, like heat tracing. Some of the high current traces may exist on multiple PCB layers to reduce current density and minimize heating.

As noted above, the clamshell plate may include ports 46 and/or channels therethrough that form conduits for accommodating flow of adhesive or other fluids such as coolant. The channels and entry ports can be constructed by making holes and cutouts in the PCB boards.

With reference to FIG. 6, for example, a PCB clamshell plate 14*c*, shown here exploded, includes at least three PCB layers stacked together: a top board 140*a*, at least one middle board 140*b* and a bottom PCB board 140*c*.

The top board 140*a* (at the top of FIG. 6) has holes 45*a* that form a portion of recess 18. The holes are sized with an inner diameter to seal against the circumference of a battery cell. In other words, the holes 45*a* have a diameter just slightly larger than diameter d c. The top board also has one or more inlet ports 46, which open to chambers formed by cutouts in the middle PCB 140*b*. There are four inlet ports in this illustrated embodiment, but other numbers are possible.

High ampacity wires or bars are soldered or fastened to the ends of the battery clamshell PCB using a plated hole 46*a*. Plated holes 46*a* serve as the power connection leads to the battery module. To maximize the ampacity of the battery clamshell end connections, additional bus bar ends 44*e* are plated on the underlying PCBs 140*b*. The bus bar ends are plated on both sides of the upper and middle PCBs 140*a*, 140*b*, with the top and bottom sides connected by plated vias on each PCB. Holes 47*a* are also plated such that when mechanical fasteners are installed to clamp 140*a*, 140*b* and 140*c*, a low resistance connection is achieved.

The middle PCB 140*b* is sandwiched between the top board and the bottom board when constructed into a clamshell plate. The middle board has holes 45*b* that are positioned on the board to align with holes 45*a*. Holes 45*b* also form a portion of recess 18. The holes are sized with an inner diameter to accommodate the circumference of the battery cell. Board 140*b* also has cutouts 48 that form chambers and channels within the thickness of the clamshell plate and through which fluids can be distributed through the plate. The cutouts 48 have a cutout open area greater than any cutouts, if any, in the top and the bottom laminate layers, such that when the plurality of laminate layers are stacked and connected together, the cutouts 48 are at least partially covered by solid portions of the top and bottom boards. Illustrated here are cutouts 48 that, when the boards are stacked and connected, form a chamber accessed by ports 46. In addition, portions 48*a* of the cutouts define channels 47 that lead to and merge with the recess holes 45*b*. If desired, multiple middle PCBs can be stacked to increase the cross sectional area of the chambers and channels within the plates. It is noted that the ports 46 in top plate 104*a* are positioned on that board to align over a cutout open area in plate 104*b*.

The bottom board (at the bottom of FIG. 6), as illustrated, has holes 45*c* that form a portion of recess 18. The holes are sized with an inner diameter to seal against the circumference of a battery cell.

Other forms of board designs may be employed. For example, while recesses 18 in this embodiment are open holes that pass from top to bottom on the clamshell plate, the recesses may be indentations. In such an embodiment, one of either the top board or the bottom board could omit the recess holes (i.e. the selected board would not have holes 45*a* or 45*c*). As such, one or more of the layers may define a closed end of the recess.

In one embodiment, one or more of the recesses 18 are configured to create an electrical connection between circuitry on the clamshell plate and the battery cell in that recess. For example, the recess can have installed therein a contact, which may be a plating that permits electrical connection to the battery cell to be installed in the recess. In one embodiment, the battery clamshell plate has recesses that interference or friction fit to the battery cells and incorporate plating in the recess holes. This interference fit and plating electrically connects the battery cell bodies to the PCBs of the clamshell.

When stacked and connected, the boards 140*a*, 140*b*, 140*c* form a rugged clamshell plate. The cutouts 48 in the middle board are covered by the solid portions of the top and bottom boards 140*a* and 140*c*. Therefore, chambers and channels are formed within the plate thickness.

In this illustrated embodiment, the stack of PCBs 140*a*, 140*b*, 140*c* are clamped together using mechanical fasteners, such as rivets. In some embodiments, there may be an array of plated holes 47*a* and/or bus bars on adjacent PCB layers may sometimes be soldered together, thereby connecting the layers together. The clamping pressure of the mechanical fasteners ensures a fluid tight seal between the layers of PCB material. Additional support structures such as a bottom clamshell can be attached using four electrically isolated holes 47*b* in each PCB. A threaded bolt or standoff can be installed in these holes without being connected to a live circuit because the area surrounding the holes 47*b* is not plated.

Temporary clamping structures 60 may be employed to hold the plates and batteries together during construction.

While the use of cutouts in a middle layer of the laminate are described here in regards to PCB's, it is to be understood that the same approach can be taken with other laminate layers constructed of other materials, and not necessarily only with PCB layers.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

While this invention has been particularly shown and described with references to preferred embodiments thereof, it will be understood by those skilled in the art that various changes in form and details may be made therein without departing from the scope of the invention encompassed by the appended claims.

The invention claimed is:

1. A battery clamshell plate comprising:
   a plurality of laminate layers stacked and connected together, the plurality of laminate layers including:
      a top printed circuit board;
      a bottom printed circuit board; and
      a middle printed circuit board sandwiched between the top and the bottom laminate layers printed circuit boards;
   wherein the middle printed circuit board includes a cutout having a cutout open area greater than any cutouts in the top and the bottom printed circuit boards, such that when the plurality of laminate layers are stacked and connected together a chamber is defined at the cutout.

2. The battery clamshell plate of claim 1, wherein at least one of the top, bottom and middle printed circuit boards incorporates battery circuitry.

3. The battery clamshell plate of claim 1, further comprising a recess configured to have an interference or friction fit on a battery cell.

4. The battery clamshell plate of claim 3, further comprising a plating in or around the recess that permits electrical conduction.

5. The battery clamshell plate of claim 3, further comprising a circuit on the top printed circuit board that includes a bus bar extending alongside the recess.

6. The battery clamshell plate of claim 1, further comprising a hole through at least one of the top and the bottom printed circuit boards, the hole being plated and configured as a power connection to the battery clamshell plate.

7. The battery clamshell plate of claim 1, further comprising an electric heat tracing system incorporated into the battery clamshell plate, the electric heat tracing system configured to adjust battery thermal conditions.

8. A battery module comprising:
   the battery clamshell plate of claim 1 and, the battery clamshell plate including a recess in at least one of the top and the bottom printed circuit boards; and
   a battery cell installed in the recess.

9. The battery module of claim 8, further comprising a plating in or around the recess that permits electrical conduction to the battery.

10. The battery module of claim 9, further comprising a circuit on the top printed circuit board that includes a bus bar extending alongside the recess.

11. The battery module of claim 8, wherein the chamber is configured as an adhesive injection manifold including an inlet port to the chamber and a conduit extending from the chamber to the recess.

12. The battery module of claim 8, wherein at least one of the top, middle or bottom printed circuit boards incorporates battery circuitry.

13. The battery module of claim 8, wherein the recess has a friction fit on the battery cell.

14. The battery module of claim 13, wherein the battery cell is secured by adhesive in the recess.

15. The battery module of claim 8, further comprising a hole through at least one of the top and the bottom printed circuit boards, the hole being plated and configured as a power connection to the battery clamshell plate.

16. The battery module of claim 8, further comprising an electric heat tracing system incorporated into the battery clamshell plate, the electric heat tracing system configured to adjust battery thermal conditions.

* * * * *

UNITED STATES PATENT AND TRADEMARK OFFICE
CERTIFICATE OF CORRECTION

| | | |
|---|---|---|
| PATENT NO. | : 12,051,817 B2 | Page 1 of 1 |
| APPLICATION NO. | : 18/479988 | |
| DATED | : July 30, 2024 | |
| INVENTOR(S) | : Eric Tischer et al. | |

It is certified that error appears in the above-identified patent and that said Letters Patent is hereby corrected as shown below:

In the Claims

<u>At Column 6</u>
In Claim 1, Line 36, please delete "laminate layers".

Signed and Sealed this
First Day of October, 2024

*Katherine Kelly Vidal*

Katherine Kelly Vidal
*Director of the United States Patent and Trademark Office*